US009353251B2

(12) United States Patent
Kito et al.

(10) Patent No.: US 9,353,251 B2
(45) Date of Patent: May 31, 2016

(54) THERMOPLASTIC RESIN COMPOSITION AND METHOD FOR PRODUCING SAME

(71) Applicants: TOYOTA BOSHOKU KABUSHIKI KAISHA, Aichi (JP); KABUSHIKI KAISHA TOYOTA CHUO KENKYUSHO, Aichi (JP)

(72) Inventors: Masayuki Kito, Aichi (JP); Jumpei Kawada, Aichi (JP); Makoto Mouri, Aichi (JP); Osamu Watanabe, Aichi (JP); Makoto Kato, Aichi (JP)

(73) Assignees: TOYOTA BOSHOKU KABUSHIKI KAISHA, Aichi (JP); KABUSHIKI KAISHA TOYOTA CHUO KENKYUSHO, Aichi (JP)

( * ) Notice: Subject to any disclaimer, the term of this patent is extended or adjusted under 35 U.S.C. 154(b) by 0 days.

(21) Appl. No.: 14/366,450

(22) PCT Filed: Dec. 21, 2012

(86) PCT No.: PCT/JP2012/083369
§ 371 (c)(1),
(2) Date: Jun. 18, 2014

(87) PCT Pub. No.: WO2013/094764
PCT Pub. Date: Jun. 27, 2013

(65) Prior Publication Data
US 2014/0364569 A1     Dec. 11, 2014

(30) Foreign Application Priority Data

Dec. 22, 2011 (JP) ................. 2011-282234
Dec. 21, 2012 (JP) ................. 2012-280271

(51) Int. Cl.
| | |
|---|---|
| C08L 23/00 | (2006.01) |
| C08L 77/00 | (2006.01) |
| C08L 23/12 | (2006.01) |
| C08L 23/02 | (2006.01) |
| C08L 77/02 | (2006.01) |
| C08L 77/06 | (2006.01) |

(52) U.S. Cl.
CPC .................. *C08L 23/12* (2013.01); *C08L 23/02* (2013.01); *C08L 77/02* (2013.01); *C08L 77/06* (2013.01); *C08L 77/00* (2013.01); *C08L 2205/02* (2013.01); *C08L 2205/03* (2013.01); *C08L 2205/08* (2013.01)

(58) Field of Classification Search
None
See application file for complete search history.

(56) References Cited

U.S. PATENT DOCUMENTS

| | | | |
|---|---|---|---|
| 4,795,782 A | 1/1989 | Lutz et al. | |
| 5,216,075 A | 6/1993 | Papazoglou | |
| 5,292,808 A * | 3/1994 | Ohmae et al. ................. 525/113 |
| 6,117,561 A * | 9/2000 | Jacquemet ............. C08L 23/06 |
| | | | 428/474.4 |
| 6,245,439 B1 | 6/2001 | Yamada et al. | |
| 2006/0185750 A1 | 8/2006 | Mestemacher | |

FOREIGN PATENT DOCUMENTS

| | | |
|---|---|---|
| CN | 1131937 | 9/1996 |
| EP | 0 261 748 | 3/1988 |
| JP | 63-89550 | 4/1988 |
| JP | 02-042109 | 2/1990 |
| JP | 04-096957 | 3/1992 |
| JP | 04-183733 | 6/1992 |
| JP | 04-202247 | 7/1992 |
| JP | 04-363349 | 12/1992 |
| JP | 07-292129 | 11/1995 |
| JP | 2003-49074 | 2/2003 |
| JP | 2003-128846 | 5/2003 |
| JP | 2003-292791 | 10/2003 |
| JP | 2005-187809 | 7/2005 |
| JP | 2010-195853 | 9/2010 |

OTHER PUBLICATIONS

International Search Report from PCT/JP2012/083369, which was mailed Apr. 2, 2013; along with an English translation.
Written Opinion from PCT/JP2012/083369, which was mailed on Apr. 2, 2013; along with an English translation.
Office Action issued in Japan Counterpart Patent Appl. No. 2012-280271, dated Aug. 11, 2015, along with an English translation thereof.
Extended European Search Report for EP Application No. 1286505.2-1306, mailed May 18, 2015.
Office Action issued in China Counterpart Patent Appl. No. 201280062730.3, dated Sep. 6, 2015, along with an English translation thereof.
Korean Office Action issued with respect to application No. 10-2014-7019356, mail date is Feb. 22, 2016.

\* cited by examiner

*Primary Examiner* — Ana Woodward
(74) *Attorney, Agent, or Firm* — Greenblum & Bernstein, P.L.C.

(57) ABSTRACT

The purpose of the present invention is to provide a thermoplastic resin composition having excellent rigidity and impact strength and a method for producing the same. The thermoplastic resin composition is obtained by mixing a polyolefin resin (such as a polypropylene resin), a polyamide resin (such as nylon 11 resin), and a compatibilizer (such as maleic anhydride-modified EPR, maleic anhydride-modified EBR). The thermoplastic resin composition is characterized in having a resin phase separate structure as observed under an electron microscope, wherein the resin phase separate structure consists of a continuous phase and a disperse phase which is dispersed in the continuous phase, there is a microdisperse phase in the disperse phase, and the average diameter of the microdisperse phase is 5 to 1,200 nm.

2 Claims, 9 Drawing Sheets

THERMOPLASTIC RESIN COMPOSITION AND METHOD FOR PRODUCING SAME

FIELD OF THE INVENTION

The present invention relates to a thermoplastic resin composition and a production method thereof. More specifically, the invention relates to a thermoplastic resin composition that is excellent in impact strength as well as rigidity, and to a production method thereof.

BACKGROUND ART

Conventionally, a polymer blend (including a polymer alloy) formed by mixing resins having different polarities to modify characteristics of the resins has been actively examined (see, for example, Patent Literatures 1 to 4).

Interior automotive components and exterior automotive components particularly require high mechanical properties, and indispensably need compatibility between impact strength and rigidity (flexural modulus).

However, in the above-described polymer blends, impact strength and rigidity are in a trade-off relation. In particular, since they are in a reciprocal relation in which when impact strength is emphasized, rigidity becomes insufficient, both of impact strength and rigidity have not been fully satisfied so far.

PRIOR ART LITERATURE

Patent Literature

Patent Literature 1: JP A 2010-195853
Patent Literature 2: JP A 2005-187809
Patent Literature 3: JP A 2003-292791
Patent Literature 4: JP A 2003-49074

SUMMARY OF THE INVENTION

Problems that the Invention is to Solve

The invention was conceived in view of the above situation. An object of the present invention is to provide a thermoplastic resin composition that is excellent in impact strength as well as rigidity, and a production method thereof.

Means for Solving Problems

The invention as described in claim 1 in order to solve the above problems is a thermoplastic resin composition formed by mixing a polyolefin resin, a polyamide resin, and a compatibilizer, and is characterized in that the thermoplastic resin composition has a resin phase separated structure which is observed with an electron microscope, that the resin phase separated structure has a continuous phase, a dispersed phase which is dispersed in the continuous phase, and a dispersed subdomain in the dispersed phase, and that an average diameter of the dispersed subdomain is in a range from 5 to 1,200 nm.

The invention as described in claim 2 is a thermoplastic resin composition in which the compatibilizer according to claim 1 is a styrene-based thermoplastic elastomer, or an olefin-based thermoplastic elastomer consisting of a polymer of an α-olefin having carbon atoms of 3 to 8 and ethylene or propylene.

The invention as described in claim 3 is a production method of the thermoplastic resin composition according to claim 1 or 2, and is characterized by comprising a mixing process in which an olefin resin and a mixed resin obtained by molten blending a polyamide resin and a compatibilizer are subjected to molten blending.

Effect of the Invention

Since the thermoplastic resin composition of the present invention includes a polyolefin resin, a polyamide resin, and a compatibilizer, and has a specific resin phase separated structure which is observed with an electron microscope, the composition is excellent in impact strength as well as rigidity.

In the case where the compatibilizer is a styrene-based thermoplastic elastomer, or an olefin-based thermoplastic elastomer consisting of a polymer of an α-olefin having carbon atoms of 3 to 8 and ethylene or propylene, the composition is more excellent in impact strength and rigidity.

According to the production method of a thermoplastic resin composition of the invention, it is possible to easily obtain a thermoplastic resin composition that is excellent in impact strength as well as rigidity.

DESCRIPTION OF EMBODIMENTS

Figure 1:
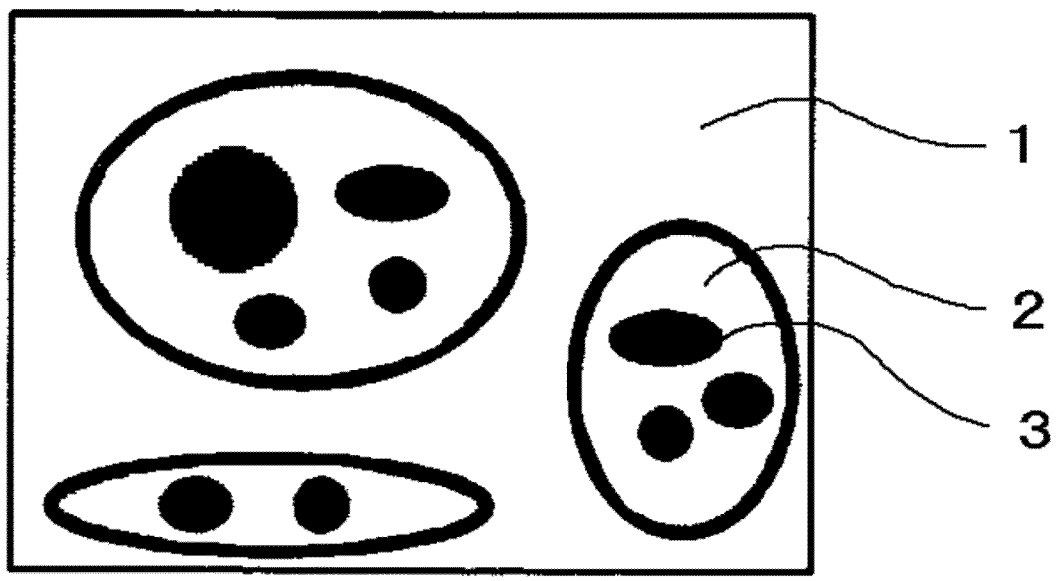
FIG. 1 is a schematic diagram illustrating a resin phase separated structure of a thermoplastic resin composition of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Thermoplastic Resin Composition

The thermoplastic resin composition of the present invention is a thermoplastic resin composition which is formed by mixing a polyolefin resin, a polyamide resin, and a compatibilizer.

1-1. Component

The polyolefin resin is not particularly limited and various polyolefin can be used. Example thereof includes an ethylene homopolymer, a propylene homopolymer, an ethylene propylene copolymer, an ethylene α-olefin copolymer, a propylene α-olefin copolymer, and the like.

The α-olefin is an unsaturated hydrocarbon compound having carbon atoms of 3 to 20, and example thereof include propylene, 1-butene, 1-pentene, 1-hexene, 1-heptene, 3-methyl-1-butene, 4-methyl-1-pentene, and the like.

The polyolefin resin may be used singly or in combination of two or more types thereof. In other words, the polyolefin resin may be a mixture consisting of the polymers described above.

The weight average molecular weight by gel permeation chromatography in terms of polystyrene for the polyolefin resin is not particularly limited. The weight average molecular weight is preferably in a range from 10,000 to 500,000, more preferably from 100,000 to 450,000, and further preferably from 200,000 to 400,000.

The polyolefin resin is a polyolefin which does not have an affinity with the polyamide resin and does not have a reactive group that reacts with the polyamide resin either. Thus, the polyolefin resin is different from a polyolefin-based component as the compatibilizer to be described below.

The polyamide resin is a polymer having a chain-like skeleton formed by polymerizing multiple monomers via an amide bond (—NH—CO—).

Examples of a monomer constituting the polyamide resin include an amino acid such as aminocaproic acid, aminoundecanoic acid, aminododecanoic acid, and p-aminomethylbenzoic acid; a lactam such as ε-caprolactam, undecanelactam, and ω-lauryllactam; and the like. These compounds may be used singly or in combination of two or more types thereof.

The polyamide resin can be prepared by polycondensation of a diamine and a dicarboxylic acid. Examples of the diamine used as the monomer include an aliphatic diamine such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; an alicyclic diamine such as cyclohexanediamine and bis(4-aminocyclohexyl)methane; an aromatic diamine such as a xylylenediamine (e.g., p-phenylenediamine and m-phenylenediamine); and the like. These compounds may be used singly or in combination of two or more types thereof.

Examples of the dicarboxylic acid used as the monomer include an aliphatic dicarboxylic acid such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; an alicyclic dicarboxylic acid such as cyclohexanedicarboxylic acid; an aromatic dicarboxylic acid such as phthalic acid, terephthalic acid, isophthalic acid, and napthalenedicarboxylic acid; and the like. These compounds may be used singly or in combination of two or more types thereof.

In the present invention, the polyamide resin is preferably a polyamide resin which includes an amide bond-containing unit having 11 carbon atoms in the main chain. Specifically, it is preferable that the polyamide resin include a structural unit derived from a monomer having 11 carbon atoms. It is particularly preferable that the polyamide resin is a polymer which is produced using 11-aminoundecanoic acid or undecanelactam as a monomer (hereinafter may be referred to as "PA11-based resin (polyamide 11-based resin)"). Since 11-aminoundecanoic acid is a monomer obtained from castor oil, 11-aminoundecanoic acid is desirable from the viewpoint of environmental protection (particularly from the viewpoint of carbon neutral).

The content of the structural unit derived from a monomer having 11 carbon atoms in the PA11-based resin is preferably 50% or more with respect to the total structural units. Specifically, the content of a structural unit derived from a monomer having less than 11 carbon atoms and/or a structural unit derived from a monomer having 12 or more carbon atoms in the PA11-based resin may be less than 50% with respect to the total structural units. The PA11-based resin may include only the structural unit derived from a monomer having 11 carbon atoms. Specifically, the PA11-based resin may be polyamide 11 (PA11).

In the present invention, examples of a preferable polyamide other than the PA11-based resin includes polyamide 6, polyamide 66, polyamide 610, polyamide 612, polyamide 614, polyamide 12, polyamide 6T, polyamide 6I, polyamide 9T, polyamide MST, polyamide 1010, polyamide 1012, polyamide 10T, polyamide MXD6, polyamide 6T/66, polyamide 6T/6I, polyamide 6T/6I/66, polyamide 6T/2M-5T, polyamide 9T/2M-8T, and the like.

The polyamide may be used singly or in combination of two or more types thereof.

In the case of using the PA11-based resin and other polyamide, a content of the other polyamide may be less than 40% by mass with respect to 100% by mass of a total of the polyamide resin.

The polyamide resin preferably has a structure in which half or more (50% or more) of the carbon atoms contained in the main chain form a chain-like skeleton. Specifically, when the polyamide resin includes an aromatic skeleton, it is preferable that less than half (less than 50%) of the carbon atoms in the main chain form the aromatic skeleton.

The weight average molecular weight by gel permeation chromatography in terms of polystyrene for the polyamide resin is not particularly limited. The weight average molecular weight is preferably in a range from 5,000 to 100,000, more preferably from 7,500 to 50,000, and further preferably from 10,000 to 50,000.

The compatibilizer is not particularly limited, but is preferably a modified elastomer in which a reactive group that reacts with the polyamide resin is substituted to an elastomer.

The elastomer is a thermoplastic elastomer in general. Among the thermoplastic elastomer, an olefin-based thermoplastic elastomer and a styrene-based thermoplastic elastomer are preferable.

Examples of the olefin-based thermoplastic elastomer include a copolymer of an α-olefin such as ethylene, propylene, 1-butene, 1-pentene, and 1-octene. Particularly, a polymer of an α-olefin having carbon atoms of 3 to 8 and ethylene or propylene, namely, a polymer of an α-olefin having carbon atoms of 3 to 8 and ethylene, and a polymer of an α-olefin having carbon atoms of 4 to 8 and propylene are preferable.

Specific examples of the olefin-based thermoplastic elastomer include an ethylene propylene copolymer (EPR), an ethylene 1-butene copolymer (EBR), an ethylene 1-pentene copolymer, an ethylene 1-octene copolymer (EOR), a propylene 1-butene copolymer (PBR), a propylene 1-pentene copolymer, a propylene 1-octene copolymer (POR), and the like. Among these, EBR and EPR are preferred.

Examples of the styrene-based thermoplastic elastomer include a block copolymer of styrene-based compound and a diene compound, a hydrogenated polymer thereof, and the like.

Examples of the styrene-based compound include styrene; an alkyl styrene such as α-methyl styrene, p-methyl styrene and p-t-butyl styrene; p-methoxy styrene, vinyl naphthalene, and the like.

Examples of the diene compound include butadiene, isoprene, piperylene, methyl pentadiene, phenyl butadiene, 3,4-dimethyl-1,3-hexadiene, 4,5-diethyl-1,3-octadiene, and the like.

Specific examples of the styrene-based thermoplastic elastomer include a styrene butadiene styrene terpolymer (SBS), a styrene isoprene styrene terpolymer (SIS), a styrene ethylene/butylene styrene tetrapolymer (SEBS), a styrene ethylene/propylene styrene tetrapolymer (SEPS), and the like. Among these, SEBS is preferable.

Examples of the reactive group that can react with the polyamide resin include an acid anhydride group (—CO—O—OC—), a carboxyl group (—COOH), an epoxy group (—C$_2$O (i.e., a three-membered ring structure consisting of two carbon atoms and one oxygen atom)), an oxazoline group (—C$_3$H$_4$NO), an isocyanate group (—NCO), and the like. The reactive group may be added to the elastomer using an arbitrary known method.

The reactive group is particularly preferably an acid anhydride group. Examples of a monomer for introducing an acid anhydride group include an acid anhydride such as maleic anhydride, phthalic anhydride, itaconic anhydride, succinic anhydride, glutaric anhydride, adipic anhydride, citraconic anhydride, tetrahydrophthalic anhydride, and butenylsuccinic anhydride. Among these, maleic anhydride, phthalic anhydride, and itaconic anhydride are preferable, and maleic anhydride is particularly preferable.

These monomers may be used singly or in combination of two or more types thereof.

In the case of using a modified elastomer into which an acid group (e.g., acid anhydride group) is introduced as the compatibilizer, the acid group content in the modified elastomer is not particularly limited.

Specific examples of the modified elastomer used as the compatibilizer according to the present invention include an anhydrous maleic acid-modified olefin-based thermoplastic elastomer such as anhydrous maleic acid-modified EPR, and anhydrous maleic acid-modified EBR; an anhydrous maleic acid-modified styrene-based thermoplastic elastomer such as anhydrous maleic acid-modified SEBS; and the like. Among these, anhydrous maleic acid-modified EPR, and anhydrous maleic acid-modified EBR are preferable.

The compatibilizer according to the present invention may be used singly or in combination of two or more types thereof.

The weight average molecular weight by gel permeation chromatography in terms of polystyrene for the compatibilizer is not particularly limited. The weight average molecular weight is preferably in a range from 10,000 to 500,000, more preferably from 20,000 to 500,000, and further preferably from 30,000 to 300,000.

1-2. Thermoplastic Resin Composition

The thermoplastic resin composition of the present invention has a resin phase separated structure which is observed with an electron microscope.

The resin phase separated structure has a continuous phase (1), a dispersed phase (2) that is dispersed in the continuous phase (1), and a dispersed subdomain (3) in the dispersed phase (2) (see FIG. 1).

The continuous phase of the resin phase separated structure may have a dispersed phase that does not include the dispersed subdomain (3) therein.

The continuous phase has only one type generally. The continuous phase may be formed of the polyolefin resin or its derivatives, or may be formed of the polyamide resin or its derivatives. Therefore, in the case where the continuous phase is substantially formed of the polyolefin resin, the dispersed phase is substantially formed of the polyamide resin. On the other hand, in the case where the continuous phase is formed of the polyamide resin, the dispersed phase (but, excluding the dispersed subdomain region) is formed of the polyolefin resin.

It is particularly preferable in the present invention that the continuous phase is substantially formed of the polyolefin resin and the dispersed phase is substantially formed of the polyamide resin.

A composition of the dispersed subdomain in the dispersed phase are not clear, but it is supposed that the dispersed subdomain is substantially formed of at least one of the polyolefin resin, the polyamide resin, the compatibilizer, and a reaction product of the compatibilizer and the resin component.

Content ratios of a component derived from the polyolefin resin, a component derived from the polyamide resin, and a component derived from the compatibilizer in the thermoplastic resin composition of the present invention is not particularly limited.

In the case where the continuous phase is formed of a polyolefin resin, the following content ratios are preferable.

A content ratio of a component derived from the polyolefin resin is preferably in a range from 35% to 90% by mass, more preferably from 35% to 85% by mass, and further preferably from 35% to 80% by mass with respect to 100% by mass of a total of the polyolefin resin, the polyamide resin, and the compatibilizer.

A content ratio of a component derived from the compatibilizer is preferably in a range from 1% to 50% by mass, more preferably from 3% to 40% by mass, and further preferably from 5% to 30% by mass with respect to 100% by mass of a total of the polyolefin resin, the polyamide resin, and the compatibilizer.

In the case where PA11, PA12, PA6, PA610, PA1010, PAMXD6, or PA10T is used as the polyamide resin, the following content ratios are preferable.

In the case where PA11 is used as the polyamide resin, its content ratio is preferably in a range from 1% to 55% by mass, more preferably from 10% to 55% by mass, and further preferably from 15% to 55% by mass with respect to 100% by mass of a total of the polyolefin resin, the polyamide resin, and the compatibilizer.

In the case where PA12 is used as the polyamide resin, its content ratio is preferably in a range from 1% to 25% by mass, more preferably from 5% to 25% by mass, and further preferably from 10% to 25% with respect to 100% by mass of a total of the polyolefin resin, the polyamide resin, and the compatibilizer.

In the case where PA6 is used as the polyamide resin, its content ratio is preferably in a range from 1% to 25% by mass, more preferably from 5% to 25% by mass, and further preferably from 10% to 25% with respect to 100% by mass of a total of the polyolefin resin, the polyamide resin, and the compatibilizer.

In the case where PA610 is used as the polyamide resin, its content ratio is preferably in a range from 1% to 40% by mass, more preferably from 5% to 40% by mass, and further preferably from 10% to 40% with respect to 100% by mass of a total of the polyolefin resin, the polyamide resin, and the compatibilizer.

In the case where PA1010 is used as the polyamide resin, its content ratio is preferably in a range from 1% to 55% by mass, more preferably from 5% to 55% by mass, and further preferably from 10% to 55% with respect to 100% by mass of a total of the polyolefin resin, the polyamide resin, and the compatibilizer.

In the case where PAMXD6 is used as the polyamide resin, its content ratio is preferably in a range from 1% to 40% by mass, more preferably from 5% to 40% by mass, and further preferably from 10% to 40% with respect to 100% by mass of a total of the polyolefin resin, the polyamide resin, and the compatibilizer.

In the case where PA10T is used as the polyamide resin, its content ratio is preferably in a range from 1% to 45% by mass, more preferably from 5% to 45% by mass, and further preferably from 10% to 45% with respect to 100% by mass of a total of the polyolefin resin, the polyamide resin, and the compatibilizer.

In the case where polyamide resins other than the above-described polyamide resins are used, their content ratios are preferably in a range from 1% to 55% by mass, more preferably from 1% to 40% by mass, and further preferably from 1% to 25% with respect to 100% by mass of a total of the polyolefin resin, the polyamide resin, and the compatibilizer.

Meanwhile, in the case where the continuous phase is formed of a polyamide resin, the following content ratios are preferable.

A content ratio of a component derived from the polyolefin resin is preferably in a range from 1% to 20% by mass, more preferably from 1% to 15% by mass, and further preferably from 1% to 10% by mass with respect to 100% by mass of a total of the polyolefin resin, the polyamide resin, and the compatibilizer.

A content ratio of a component derived from the polyamide resin is preferably in a range from 70% to 90% by mass, more preferably from 75% to 90% by mass, and further preferably from 80% to 90% by mass with respect to 100% by mass of a total of the polyolefin resin, the polyamide resin, and the compatibilizer.

A content ratio of a component derived from the compatibilizer is preferably in a range from 1% to 50% by mass, more preferably from 3% to 40% by mass, and further preferably from 5% to 30% by mass with respect to 100% by mass of a total of the polyolefin resin, the polyamide resin, and the compatibilizer.

An average diameter (average particle diameter) of the dispersed phase is preferably 10,000 nm or smaller, more preferably in a range from 50 to 8,000 nm, and further preferably from 100 to 4,000 nm.

The average diameter of the dispersed phase can be measured based on images obtained using an electron microscope or the like.

An average diameter (average particle diameter) of the dispersed subdomain is in a range from 5 to 1,200 nm, preferably from 5 to 1,000 nm, more preferably from 5 to 600 nm, further preferably from 10 to 400 nm, and particularly from 15 to 350 nm.

The average diameter of the dispersed subdomain can be measured based on images obtained using an electron microscope or the like.

The thermoplastic resin composition of the present invention is obtained by molten blending a polyolefin resin, a polyamide resin, and a compatibilizer. The "molten blending" will be described in detail with reference to a production method of the thermoplastic resin composition below.

2. Production Method of Thermoplastic Resin Composition

The production method of the thermoplastic resin composition of the present invention is a method for producing the thermoplastic resin composition as described in the above section 1, and is characterized by including a mixing process in which an olefin resin and a mixed resin obtained by molten blending a polyamide resin and a compatibilizer are subjected to molten blending.

2-1 Raw Material

The above explanation about the "polyolefin resin", "polyamide resin", and "compatibilizer" can be applied hereto.

2-2 Mixing Process

The mixing process is a step of molten blending a polyolefin resin, and a mixed resin obtained by mixing a polyamide resin and a compatibilizer.

When the mixed resin obtained by molten blending the polyamide resin and the compatibilizer in advance is used, the function of the compatibilizer can be more effectively. It is considered that a situation in which the compatibilizer is independently dispersed in the polyolefin resin without achieving its function can be suppressed by mixing the compatibilizer with the polyamide resin (dispersion phase or continuous phase) in advance.

The mixed resin may be solidified by pelletization or the like, or may be melt.

The mixed resin may be obtained by molten blending the polyamide resin and the compatibilizer using a mixing device such as an extruder (e.g., single-screw extruder or twin-screw extruder), a kneader, and a mixer (e.g., high-speed flow mixer, puddle mixer, or ribbon mixer). These mixing devices may be used either alone or in combination. In the case of using two or more mixing devices, the mixing devices may be operated continuously, or may be operated batch type. The polyamide resin and the compatibilizer may be mixed at a time, or may be mixed while adding the polyamide resin or the compatibilizer in parts (multi-step addition).

The mixing temperature employed when molten blending the polyamide resin and the compatibilizer is not particularly limited. The mixing temperature may be appropriately adjusted corresponding to the type of each component. It is particularly preferable to mix the polyamide resin and the compatibilizer in a state in which each compound is melted. The mixing temperature is specifically in a range from 190° C. to 350° C., preferably from 200° C. to 330° C., and more preferably 205° C. to 310° C.

In the mixing process, the molten blending can be conducted using a mixing device such as an extruder (e.g., single-screw extruder or twin-screw extruder), a kneader, and a mixer (e.g., high-speed flow mixer, puddle mixer, or ribbon mixer). These mixing devices may be used either alone or in combination. In the case of using two or more mixing devices, the mixing devices may be operated continuously, or may be operated batch type. The first mixed resin and the polyolefin resin may be mixed at a time, or may be mixed while adding the components in parts (multi-step addition).

The mixing temperature employed in the mixing process is not particularly limited as long as the components can be molten blended. The mixing temperature may be appropriately adjusted corresponding to the type of each component. It is particularly preferable to mix the components in a state in which the thermoplastic resin is melted. The mixing temperature is specifically in a range from 190° C. to 350° C., preferably from 200° C. to 300° C., and more preferably 205° C. to 260° C.

The mixing process may be implemented by (1) molten blending the polyolefin resin with the mixed resin that is solidified by pelletization or the like in advance, or (2) molten blending the polyamide resin and the compatibilizer on the upstream side using a multi-step addition-type mixing device or the like, and adding the polyolefin resin on the downstream side within the device to mix the polyolefin resin and a melt-mixture (mixed resin) of the polyamide resin and the compatibilizer.

Mixing ratios of the polyolefin resin, the polyamide resin, and the compatibilizer in the production method of the thermoplastic resin composition in the present invention is not particularly limited.

In the case of using a polyolefin resin to form the continuous phase, the following ratios are preferable.

A mixing ratio of the polyolefin resin is preferably in a range from 35% to 90% by mass, more preferably from 35% to 85% by mass, and further preferably from 35% to 80% by mass with respect to 100% by mass of a total of the polyolefin resin, the polyamide resin, and the compatibilizer.

A mixing ratio of the compatibilizer is preferably in a range from 1% to 50% by mass, more preferably from 3% to 40% by mass, and further preferably from 5% to 30% by mass with respect to 100% by mass of a total of the polyolefin resin, the polyamide resin, and the compatibilizer.

In the case where PA11, PA12, PA6, PA610, PA1010, PAMXD6, or PA10T is used as the polyamide resin, the following mixing ratios are preferable.

In the case where PA11 is used as the polyamide resin, its mixing ratio is preferably in a range from 1% to 55% by mass, more preferably from 10% to 55% by mass, and further preferably from 15% to 55% by mass with respect to 100% by mass of a total of the polyolefin resin, the polyamide resin, and the compatibilizer.

In the case where PA12 is used as the polyamide resin, its mixing ratio is preferably in a range from 1% to 25% by mass, more preferably from 5% to 25% by mass, and further preferably from 10% to 25% with respect to 100% by mass of a total of the polyolefin resin, the polyamide resin, and the compatibilizer.

In the case where PA6 is used as the polyamide resin, its mixing ratio is preferably in a range from 1% to 25% by mass, more preferably from 5% to 25% by mass, and further preferably from 10% to 25% with respect to 100% by mass of a total of the polyolefin resin, the polyamide resin, and the compatibilizer.

In the case where PA610 is used as the polyamide resin, its mixing ratio is preferably in a range from 1% to 40% by mass, more preferably from 5% to 40% by mass, and further preferably from 10% to 40% with respect to 100% by mass of a total of the polyolefin resin, the polyamide resin, and the compatibilizer.

In the case where PA1010 is used as the polyamide resin, its mixing ratio is preferably in a range from 1% to 55% by mass, more preferably from 5% to 55% by mass, and further preferably from 10% to 55% with respect to 100% by mass of a total of the polyolefin resin, the polyamide resin, and the compatibilizer.

In the case where PAMXD6 is used as the polyamide resin, its mixing ratio is preferably in a range from 1% to 40% by mass, more preferably from 5% to 40% by mass, and further preferably from 10% to 40% with respect to 100% by mass of a total of the polyolefin resin, the polyamide resin, and the compatibilizer.

In the case where PA10T is used as the polyamide resin, its mixing ratio is preferably in a range from 1% to 45% by mass, more preferably from 5% to 45% by mass, and further preferably from 10% to 45% with respect to 100% by mass of a total of the polyolefin resin, the polyamide resin, and the compatibilizer.

In the case where polyamide resins other than the above-described polyamide resins are used, their mixing ratios are preferably in a range from 1% to 55% by mass, more preferably from 1% to 40% by mass, and further preferably from 1% to 25% with respect to 100% by mass of a total of the polyolefin resin, the polyamide resin, and the compatibilizer.

Meanwhile, in the case where the continuous phase is formed using a polyamide resin, the following mixing ratios are preferable.

A mixing ratio of the polyolefin resin is preferably in a range from 1% to 20% by mass, more preferably from 1% to 15% by mass, and further preferably from 1% to 10% by mass with respect to 100% by mass of a total of the polyolefin resin, the polyamide resin, and the compatibilizer.

A mixing ratio of the polyamide resin is preferably in a range from 70% to 90% by mass, more preferably from 75% to 90% by mass, and further preferably from 80% to 90% by mass with respect to 100% by mass of a total of the polyolefin resin, the polyamide resin, and the compatibilizer.

A mixing ratio of the compatibilizer is preferably in a range from 1% to 50% by mass, more preferably from 3% to 40% by mass, and further preferably from 5% to 30% by mass with respect to 100% by mass of a total of the polyolefin resin, the polyamide resin, and the compatibilizer.

The thermoplastic resin composition of the present invention may contain components other than the polyolefin resin, the polyamide resin, and the compatibilizer within a range that does not impede the object of the invention. Examples of the other components include thermoplastic resins other than the above-described ones, a flame retardant, a flame retardant aid, fillers, a coloring agent, an antibacterial agent, an antistatic agent, and the like. These components may be used singly or in combination of two or more types thereof.

Examples of the other thermoplastic resins include a polyester-based resin such as polybutylene terephthalate, polyethylene terephthalate, polycarbonate, polybutylene succinate, polyethylene succinate and poly lactic acid; and the like.

Examples of the flame retardant include a halogen-based flame retardant such as a halogenated aromatic compound; a phosphorus-based flame retardant such as a nitrogen-containing phosphate compound and a phosphate ester; a nitrogen-based flame retardant such as guanidine, triazine, melamine, and derivatives thereof; an inorganic flame retardant such as a metal hydroxide; a boron-based flame retardant; a silicone-based flame retardant; a sulfur-based flame retardant; a red phosphorus-based flame retardant; and the like.

Examples of the flame retardant aid include various antimony compounds, metal compounds containing zinc, metal compounds containing bismuth, magnesium hydroxide, clayey silicates, and the like.

Examples of the fillers include glass components including a glass fiber, glass beads, a glass flake, and the like; silica; an inorganic fiber such as a glass fiber, an alumina fiber, and a carbon fiber; graphite; a silicic acid compound such as calcium silicate, aluminum silicate, kaolin, talc, and clay; a metal oxide such as iron oxide, titanium oxide, zinc oxide, antimony oxide, and alumina; a carbonate or sulfate of a metal such as calcium, magnesium, and zinc; an organic fiber such as an aromatic polyester fiber, an aromatic polyamide fiber, a fluoric resin fiber, a polyimide fiber, and a vegetable fiber; and the like.

Examples of the colorant include pigments and dyes.

3. Molded Article

The thermoplastic resin composition of the present invention may be formed using an optionally method. The shape, size, thickness, and the like of the resulting formed article are not particularly limited. Application use thereof is not particularly limited. The molded article is used as an exterior material, an interior material, or a structural material for automobiles, rail vehicles, ships, airplanes, and the like. Examples of the automotive materials include an automotive exterior material, an automotive interior material, an automotive structural material, an engine room part, and the like. Specific examples of the automotive materials include a bumper, a spoiler, a cowling, a front grille, a garnish, a bonnet, a trunk lid, a fender panel, a door panel, a roof panel, an instrument panel, a door trim, a quarter trim, a roof lining, a pillar garnish, a deck trim, a tonneau board, a package tray, a dashboard, a console box, a kicking plate, a switch base, a sheet backboard, a sheet frame, an armrest, a sun visor, an intake manifold, an engine head cover, an engine under cover, an oil filter housing, a housing of an on-board electronic device (e.g., ECU or TV monitor), an air filter box, and the like. The formed article may also be used as an interior material, an exterior material, and a structural material used for buildings, furniture, and the like. For example, the formed article may be used as a door mounting material, a door structural material, a furniture (e.g., desk, chair, shelf, or chest of drawers) mounting/structural material, and the like. The formed article may also be used as a package, a container (e.g., tray), a protective member, a partition member, and the like. The formed article may also be used as a housing and a structural member of home appliances (e.g., flat TV, refrigerator, washing machine, cleaner, mobile phone, portable game machine, and notebook-sized personal computer).

EXAMPLES

Hereinafter, the present invention will be described in more detail by way of Examples.

[1] Production of Thermoplastic Resin Composition Using PA11 as Polyamide Resin, and Making of Test Piece Example 1

(1) Preparation of Mixed Resin

PA11 "Rilsan BMN O" (nylon 11 resin, Mw=18,000, mp=190° C.) manufactured by ARKEMA K.K. was used as a polyamide resin (A). Anhydrous maleic acid-modified EPR "Tafmer MP0620" (MFR=0.3 g/10 min. at 230° C.) manufactured by Mitsui Chemicals Inc. was used as a compatibilizer (C). Each pellet thereof was dry-blended so as to have a mixing ratio as listed in Table 1. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 1. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Example 1.

After that, the resulting thermoplastic resin composition pellet for Example 1 was put into a hopper of an injection molding machine (40-ton injection molding machine) manufactured by Nissei Plastic Ind., Co., Ltd., to prepare a test piece for evaluation under conditions of a set temperature at 210° C. and a mold temperature at 60° C.

Examples 2 to 11

Pellets of thermoplastic resin compositions for Examples 2 to 11 were produced in the same manner as that in Example 1 except that anhydrous maleic acid-modified EBR "Tafmer MH7020" (MFR=1.5 g/10 min. at 230° C.) manufactured by Mitsui Chemicals Inc. was used as a compatibilizer (C) and each pellet thereof was dry-blended so as to have a mixing ratio as listed in Table 1. After that, injection molding was carried out in the same manner as that in Example 1 to prepare test pieces for Examples 2 to 11.

Comparative Example 1

A pellet of thermoplastic resin composition for Comparative Example 1 was produced in the same manner as that in Example 1 except that anhydrous maleic acid-modified PP "Umex 1001" (Mw=40,000, acid value=26, MFR=0.7 g/10 min. at 230° C.) manufactured by Sanyo Chemical Ind., Ltd. was used as a compatibilizer (C) and each pellet thereof was dry-blended so as to have a mixing ratio as listed in Table 1. After that, injection molding was carried out in the same manner as that in Example 1 to prepare a test piece for Comparative Example 1.

Comparative Example 2

A pellet of thermoplastic resin composition for Comparative Example 2 was produced in the same manner as that in Example 1 except that non-modified EPR "Tafmer P-0680" (MFR=0.7 g/10 min. at 230° C.) manufactured by Mitsui Chemicals Inc. was used as a compatibilizer (C) and each pellet thereof was dry-blended so as to have a mixing ratio as listed in Table 1. After that, injection molding was carried out in the same manner as that in Example 1 to prepare a test piece for Comparative Example 2.

Comparative Example 3

A pellet of thermoplastic resin composition for Comparative Example 3 was produced in the same manner as that in Example 1 except that non-modified EBR "Tafmer A-1070S" (MFR=2.2 g/10 min. at 230° C.) manufactured by Mitsui Chemicals Inc. was used as a compatibilizer (C) and each pellet thereof was dry-blended so as to have a mixing ratio as listed in Table 1. After that, injection molding was carried out in the same manner as that in Example 1 to prepare a test piece for Comparative Example 3.

[2] Evaluation of Thermoplastic Resin Composition (Examples 1 to 11)
(1) Measurement of Charpy Impact Strength Test pieces for evaluation obtained in Examples 1 to 11 of the above section [1] were subjected to measurement in accordance with JIS K7111-1 for Charpy impact strength. Results thereof were shown in Tables 2 and 3. In the measurement of Charpy impact strength, the impact was measured by an edgewise test method at a temperature of 23° C. with a test piece having notch (type A).

(2) Observation of Morphology

A fracture surface of each test piece according to Examples 1 to 11 and Comparative Examples 1 to 3 provided for the measurement of Charpy impact strength in the above section (1) was etched with oxygen plasma at 100 W for 1 minute and then coated with osmium. After that, a field-emission scanning electron microscope manufactured by JEOL Ltd. was used for observation to check a resin phase separated structure. Results thereof were shown in Tables 2 and 3.

Figure 2:
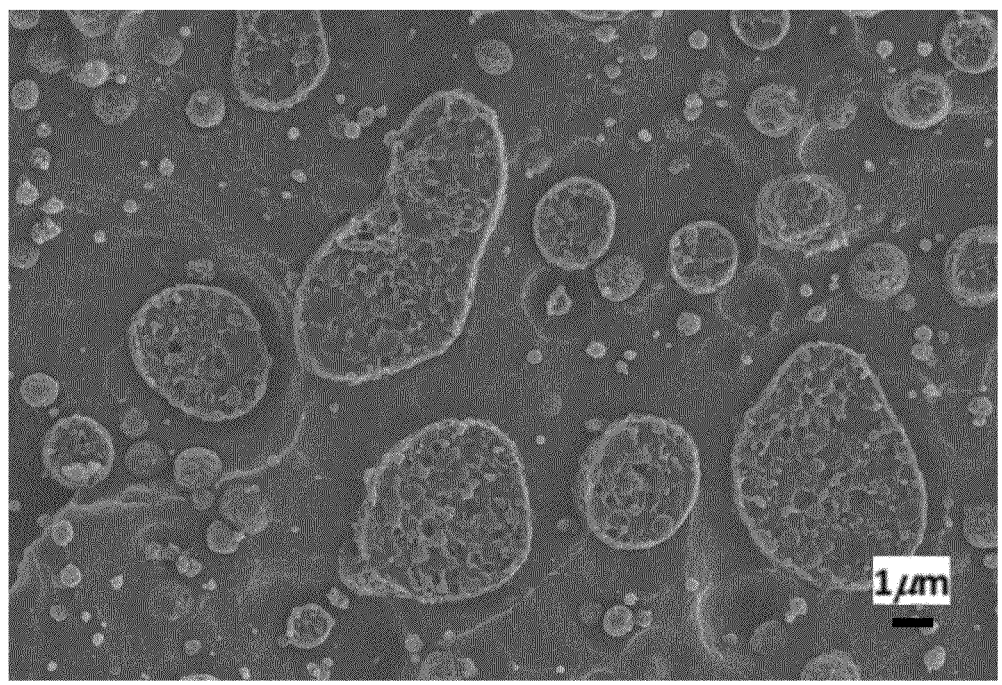
FIG. 2 is an explanatory diagram illustrating a resin phase separated structure by FE-SEM observation of a sample which is etched with oxygen plasma at 100 W for 1 minute and then coated with osmium in Example 1.
Figure 3:
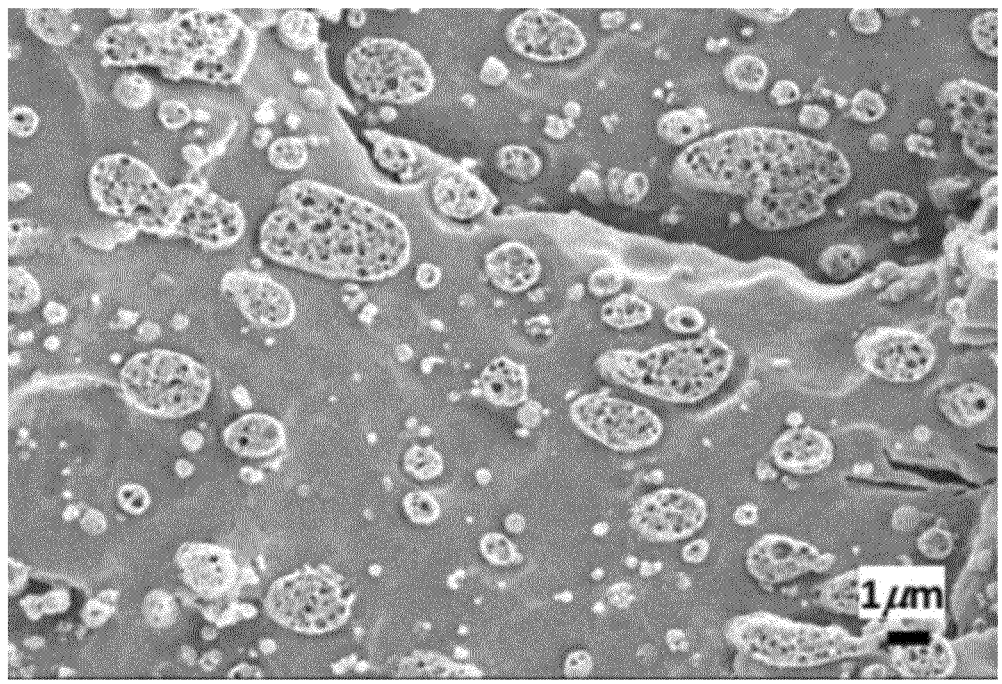
FIG. 3 is an explanatory diagram illustrating a resin phase separated structure by FE-SEM observation of a sample which is etched with oxygen plasma at 100 W for 1 minute and then coated with osmium in Example 2.
Figure 4:
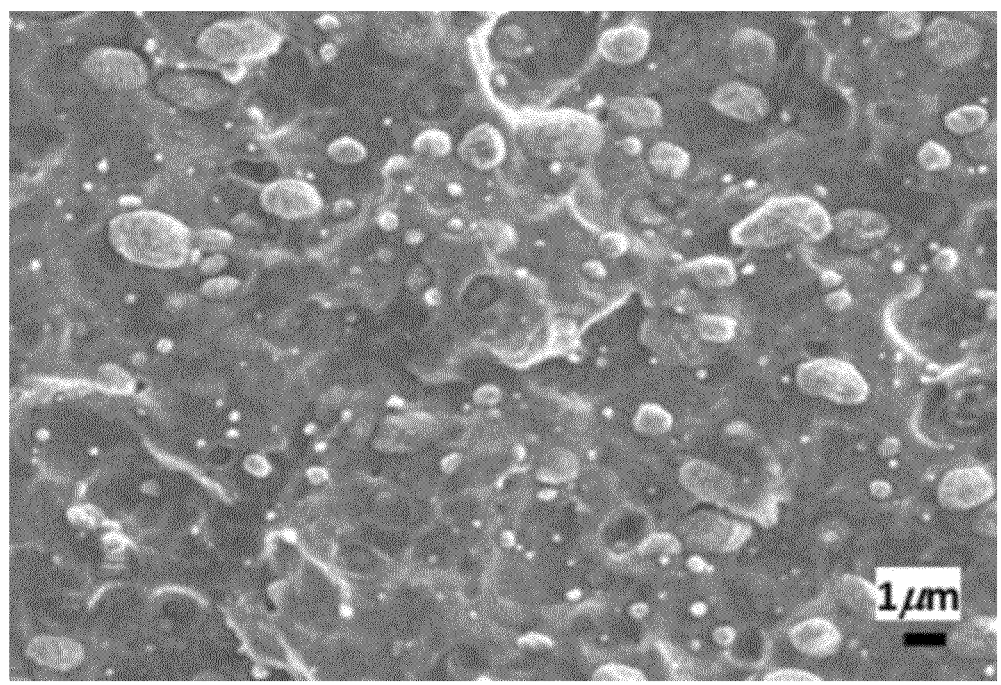
FIG. 4 is an explanatory diagram illustrating a resin phase separated structure by FE-SEM observation in Comparative Example 1.

Further, images obtained from Examples 1 and 2 and Comparative Example 1 were shown in FIGS. 2, 3, and 4, respectively.

(3) Measurement of Flexural Modulus

Test pieces for evaluation obtained in Examples 1 to 11 and Comparative Examples 1 to 3 of the above section [1] were subjected to measurement in accordance with JIS K7171 for flexural modulus. Results thereof were shown in Tables 2 and 3. The flexural modulus was measured by supporting each of test pieces at two points (radius of curvature: 5 mm) with a distance L of 64 mm therebetween while applying a load at a speed of 2 mm/min from an action point (radius of curvature: 5 mm) positioned in the middle of the two points.

TABLE 2

| | Example | | Comparative Example | | |
|---|---|---|---|---|---|
| | 1 | 2 | 1 | 2 | 3 |
| Type of phase separated structure | Continuous phase: PP Dispersed phase: PA | | Continuous phase: PP Dispersed phase: PA | | |
| Presence or absence of dispersed | Present | Present | Absent | Absent | Absent |

TABLE 1

| | | | | Example | | | | | | | | | | | Comparative Example | | |
|---|---|---|---|---|---|---|---|---|---|---|---|---|---|---|---|---|---|
| | | | | 1 | 2 | 3 | 4 | 5 | 6 | 7 | 8 | 9 | 10 | 11 | 1 | 2 | 3 |
| Mixing ratio (% by mass) | A | Polyamide resin(PA11) | | 20 | 20 | 5 | 10 | 25 | 30 | 40 | 25 | 25 | 25 | 25 | 20 | 20 | 20 |
| | B | Polyolefin resin | | 70 | 70 | 85 | 80 | 65 | 60 | 50 | 70 | 60 | 55 | 45 | 70 | 70 | 70 |
| | C | Compatibilizer | Anhydrous maleic acid-modified EPR | 10 | — | — | — | — | — | — | — | — | — | — | — | — | — |
| | | | Anhydrous maleic acid-modified EBR | — | 10 | 10 | 10 | 10 | 10 | 10 | 5 | 15 | 20 | 30 | — | — | — |
| | | | Anhydrous maleic acid-modified PP | — | — | — | — | — | — | — | — | — | — | — | 10 | — | — |
| | | | Non-modified EPR | — | — | — | — | — | — | — | — | — | — | — | — | 10 | — |
| | | | Non-modified EBR | — | — | — | — | — | — | — | — | — | — | — | — | — | 10 |

TABLE 2-continued

|  | Example | | Comparative Example | | |
|---|---|---|---|---|---|
|  | 1 | 2 | 1 | 2 | 3 |
| subdomain in dispersed phase |  |  |  |  |  |
| Average diameter of dispersed subdomain (nm) | 50-600 | 20-200 | — | — | — |
| Charpy impact strength (kJ/m$^2$) | 6.5 | 10.1 | 1.4 | 2.7 | 4.2 |
| Flexural modulus (MPa) | 1,238 | 1,241 | 1,386 | 1,251 | 1,352 |

TABLE 3

|  | Example | | | | | | | | |
|---|---|---|---|---|---|---|---|---|---|
|  | 3 | 4 | 5 | 6 | 7 | 8 | 9 | 10 | 11 |
| Type of phase separated structure | Continuous phase: PP Dispersed phase: PA | | | | | | | | |
| Presence or absence of dispersed subdomain in dispersed phase | Present | Present | Present | Present | Present | Present | Present | Present | Present |
| Charpy impact strength (kJ/m$^2$) | 6.6 | 8.0 | 8.8 | 9.5 | 10.3 | 3.8 | 17.9 | 72.9 | 69.4 |
| Flexural modulus (MPa) | 1,078 | 1,046 | 1,184 | 1,182 | 1,148 | 1,275 | 952 | 775 | 453 |

[3] Evaluation Result (Effects of Example 1 to 11)

According to the results in Tables 2 and 3, and images in FIGS. 2 to 4, it could be seen that the resin phase separated structures in the test pieces from Examples 1 to 11 include a continuous phase and a dispersed phase and additionally a dispersed subdomain having an average diameter of 5 to 1,200 nm (specifically, 20 to 600 nm) in the dispersed phase (that is, a salami structure). Meanwhile, it could be seen that resin phase separated structures in test pieces from Comparative Examples 1 to 3 include a continuous phase and a dispersed phase but do not include a dispersed subdomain in the dispersed phase.

Comparing Examples 1 and 2 and Comparative Examples 1 to 3 that have the same mixing ratio between a polyamide resin and a polyolefin resin in Table 2, it is found that Examples 1 and 2 in which a dispersed subdomain was in a dispersed phase had flexural moduli of 1,238 to 1,241 MPa, and Charpy impact strengths of 6.5 to 10.1 kJ/m$^2$, and that Examples 1 and 2 were excellent in impact strength as well as rigidity. On the other hand, in Comparative Examples 1 to 3 in which a dispersed subdomain was not in a dispersed phase, one of flexural modulus and Charpy impact strength was deteriorated.

Clearly from results in Table 3, it is found that Examples 3 to 11 had flexural moduli of 453 to 1,184 MPa, and Charpy impact strengths of 3.8 to 72.9 kJ/m$^2$, and each characteristic could be adjusted by changing a mixing ratio of a polyamide resin, a polyolefin resin, and a compatibilizer.

[4] Production of Thermoplastic Resin Composition Using Resin Other than PA11 as Polyamide Resin, and Making of Test Piece Example 12

(1) Preparation of Mixed Resin

PA12 "Rilsan AECN OTL" (nylon 12 resin, mp=174-178° C.) manufactured by ARKEMA K.K. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 210° C., an extrusion speed at 2.0 kg/hr, and the number of screw revolution at 200 rpm. An extruded thermoplastic resin composition was then cut using a pelletizer so as to prepare a thermoplastic resin composition pellet for Example 12.

After that, the resulting thermoplastic resin composition pellet for Example 12 was put into a hopper of an injection molding machine (40-ton injection molding machine) manufactured by Nissei Plastic Ind., Co., Ltd., to prepare a test piece for evaluation under conditions of a set temperature at 210° C. and a mold temperature at 60° C.

Example 13

(1) Preparation of Mixed Resin

PA6 "1010X1" (nylon 6 resin, mp=225° C.) manufactured by Ube Ind., Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 260° C., an extrusion speed at 2.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=15 mm, L/D=59) manufactured by Technovel Corp., and mixed therein under conditions of a kneading temperature at 260° C., an extrusion speed at 2.0 kg/hr, and the number of screw revolution at 200 rpm. An extruded thermoplastic resin composition was then cut using a pelletizer so as to prepare a thermoplastic resin composition pellet for Example 13.

After that, the resulting thermoplastic resin composition pellet for Example 13 was put into a hopper of an injection molding machine (40-ton injection molding machine) manufactured by Nissei Plastic Ind., Co., Ltd., to prepare a test piece for evaluation under conditions of a set temperature at 260° C. and a mold temperature at 60° C.

Example 14

(1) Preparation of Mixed Resin

PA610 "Vestamid Terra HS16" (nylon 610 resin, mp=222° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 235° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 235° C., an extrusion speed at 3.0 kg/hr, and the number of screw revolution at 200 rpm. An extruded thermoplastic resin composition was then cut using a pelletizer so as to prepare a thermoplastic resin composition pellet for Example 14.

After that, the resulting thermoplastic resin composition pellet for Example 14 was put into a hopper of an injection molding machine (40-ton injection molding machine) manufactured by Nissei Plastic Ind., Co., Ltd., to prepare a test piece for evaluation under conditions of a set temperature at 235° C. and a mold temperature at 60° C.

Example 15

A pellet of a thermoplastic resin composition for Example 15 was produced in the same manner as that in Example 14 except that each pellet was dry-blended so as to have a mixing ratio as listed in Table 4. Then, injection molding was carried out in the same manner as that in Example 14 to prepare a test piece for Example 15.

Example 16

(1) Preparation of Mixed Resin

PA1010 "Vestamid Terra DS16" (nylon 1010 resin, mp=191° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 250° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 250° C., an extrusion speed at 3.0 kg/hr, and the number of screw revolution at 200 rpm. An extruded thermoplastic resin composition was then cut using a pelletizer so as to prepare a thermoplastic resin composition pellet for Example 16.

After that, the resulting thermoplastic resin composition pellet for Example 16 was put into a hopper of an injection molding machine (40-ton injection molding machine) manufactured by Nissei Plastic Ind., Co., Ltd., to prepare a test piece for evaluation under conditions of a set temperature at 250° C. and a mold temperature at 60° C.

Examples 17 to 18

Pellets of thermoplastic resin compositions for Examples 17 and 18 were produced in the same manner as that in Example 16 except that each pellet was dry-blended so as to have a mixing ratio as listed in Table 4. Then, injection molding was carried out in the same manner as that in Example 16 to prepare test pieces for Example 17 and 18.

Example 19

(1) Preparation of Mixed Resin

PAMXD6 "Reny 6002" (nylon MXD6 resin, mp=243° C.) manufactured by Mitsubishi Engineering-Plastics Corp. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 265° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 265° C., an extrusion speed at 3.0 kg/hr, and the number of screw revolution at 200 rpm. An extruded thermoplastic resin composition was then cut using a pelletizer so as to prepare a thermoplastic resin composition pellet for Example 19.

After that, the resulting thermoplastic resin composition pellet for Example 19 was put into a hopper of an injection molding machine (40-ton injection molding machine) manufactured by Nissei Plastic Ind., Co., Ltd., to prepare a test piece for evaluation under conditions of a set temperature at 265° C. and a mold temperature at 90° C.

Example 20

A pellet of a thermoplastic resin composition for Example 20 was produced in the same manner as that in Example 19 except that each pellet was dry-blended so as to have a mixing ratio as listed in Table 4. Then, injection molding was carried out in the same manner as that in Example 19 to prepare a test piece for Example 20.

Example 21

(1) Preparation of Mixed Resin

PA10T "Vestamid HT Plus M300" (nylon 10T resin, mp=285° C.) manufactured by Daicel-Evonik Ltd. was used as a polyamide resin (A). Anhydrous maleic acid-modified EBR "Tafmer MH7020" (MFR=1.5 g/10 min. at 230° C.) manufactured by Mitsui Chemicals Inc. was used as a compatibilizer (C). Each pellet thereof was dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 310° C., an extrusion speed at 3.0 kg/hr, and the number of screw revolution at 200 rpm. An extruded mixed resin was then cut using a pelletizer so as to prepare a mixed resin pellet.

(2) Mixing Process

A polypropylene resin "Novatec MA1B" (homopolymer, Mw=312,000, mp=165° C.) manufactured by Japan Polypropylene Corp. as a polyolefin resin (B) and the previously mixed resin pellet were dry-blended so as to have a mixing ratio as listed in Table 4. Subsequently, the mixture was charged into a twin screw kneading extruder (screw diameter=25 mm, L/D=41) manufactured by Parker Corp., Inc. and mixed therein under conditions of a kneading temperature at 310° C., an extrusion speed at 3.0 kg/hr, and the number of screw revolution at 200 rpm. An extruded thermoplastic resin composition was then cut using a pelletizer so as to prepare a thermoplastic resin composition pellet for Example 21.

After that, the resulting thermoplastic resin composition pellet for Example 21 was put into a hopper of an injection molding machine (40-ton injection molding machine) manufactured by Nissei Plastic Ind., Co., Ltd., to prepare a test piece for evaluation under conditions of a set temperature at 310° C. and a mold temperature at 90° C.

TABLE 4

Figure 5:
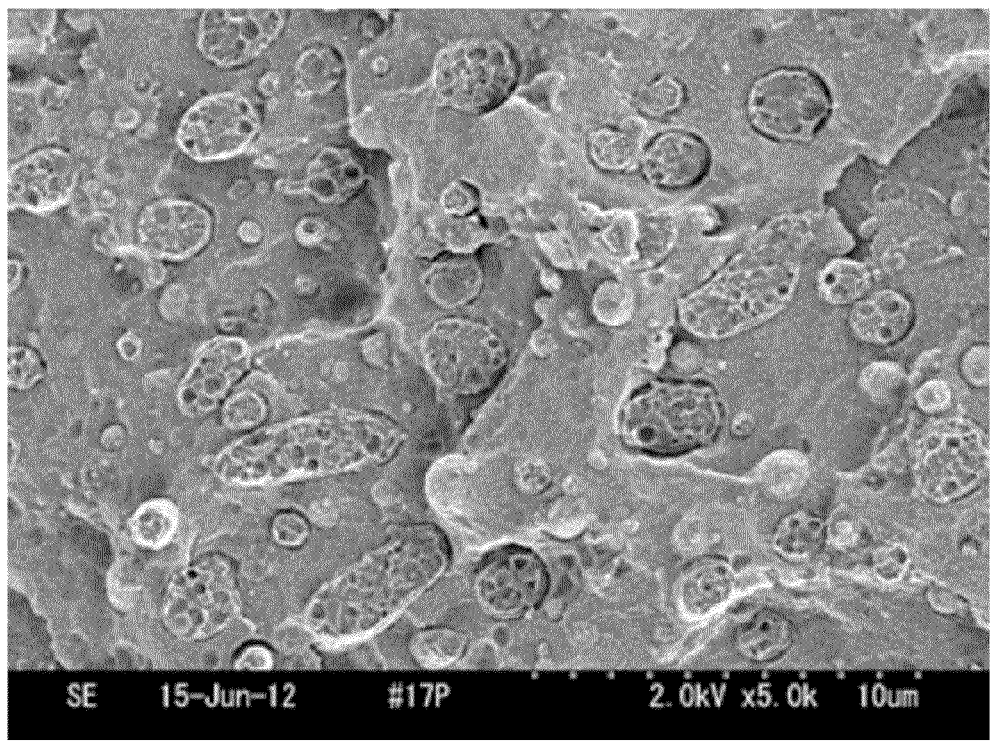
FIG. 5 is an explanatory diagram illustrating a resin phase separated structure by FE-SEM observation of a sample which is etched with oxygen plasma at 100 W for 1 minute and then coated with osmium in Example 12.
Figure 6:
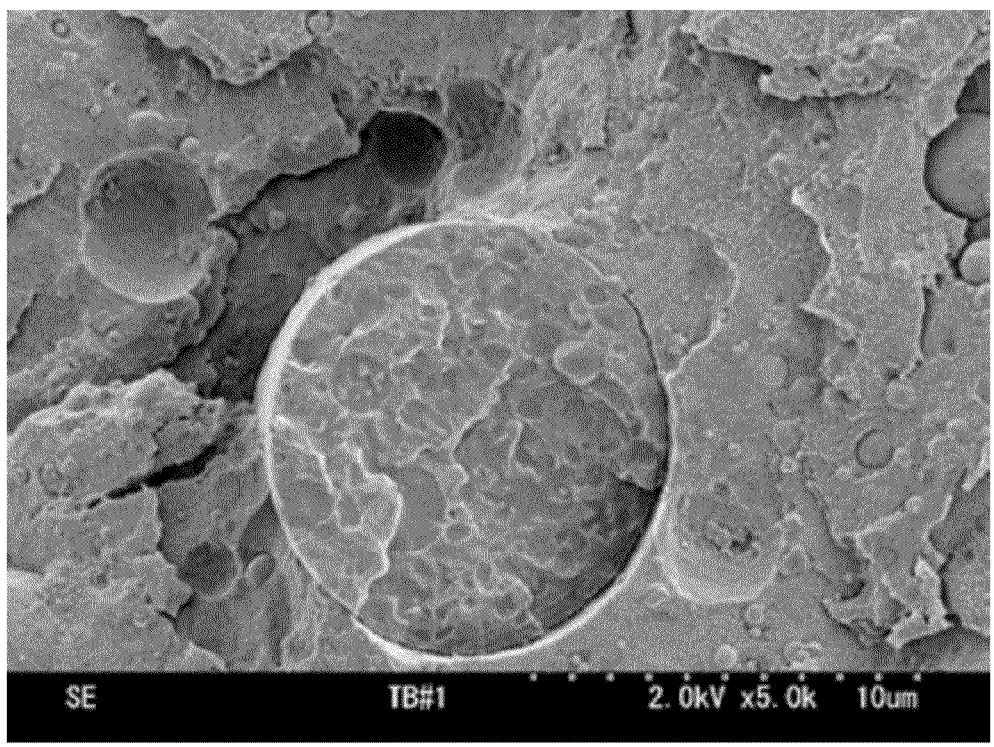
FIG. 6 is an explanatory diagram illustrating a resin phase separated structure by FE-SEM observation of a sample which is etched with oxygen plasma at 100 W for 1 minute and then coated with osmium in Example 13.
Figure 7:
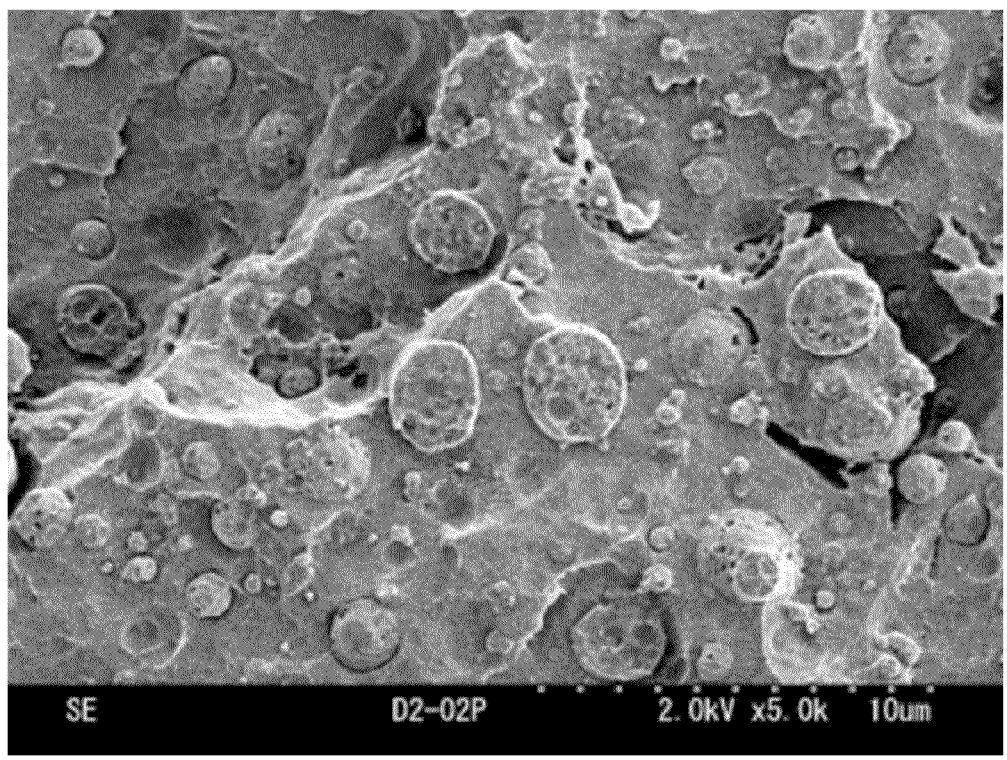
FIG. 7 is an explanatory diagram illustrating a resin phase separated structure by FE-SEM observation of a sample which is etched with oxygen plasma at 100 W for 1 minute and then coated with osmium in Example 14.
Figure 8:
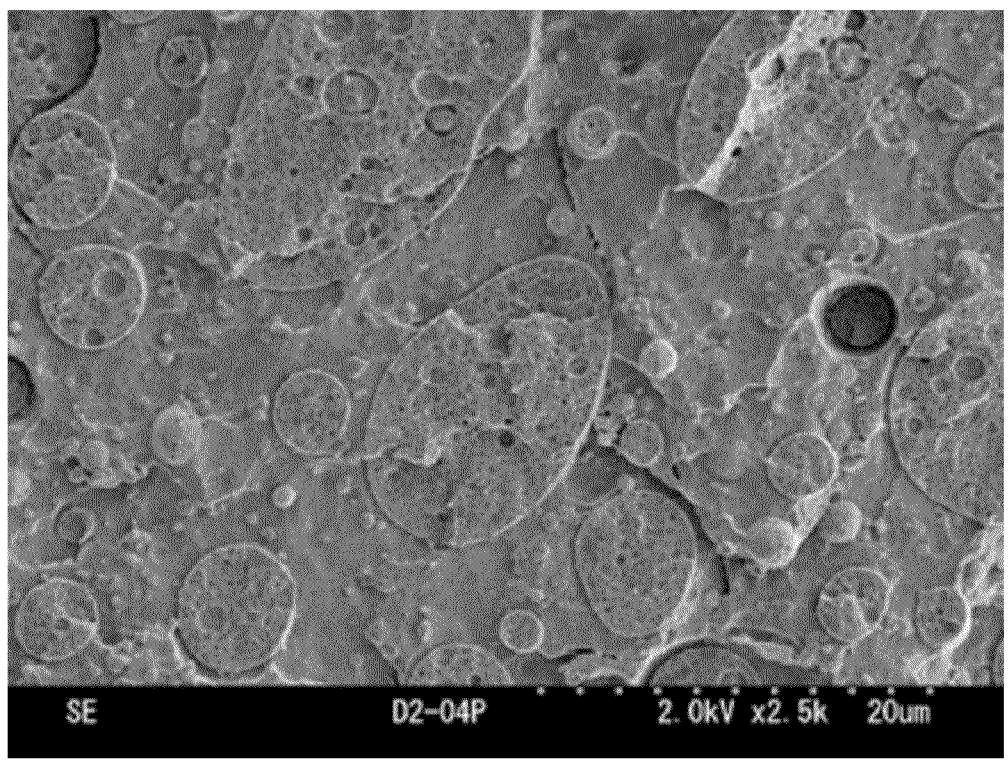
FIG. 8 is an explanatory diagram illustrating a resin phase separated structure by FE-SEM observation (low-magnification) of a sample which is etched with oxygen plasma at 100 W for 1 minute and then coated with osmium in Example 15.
Figure 9:
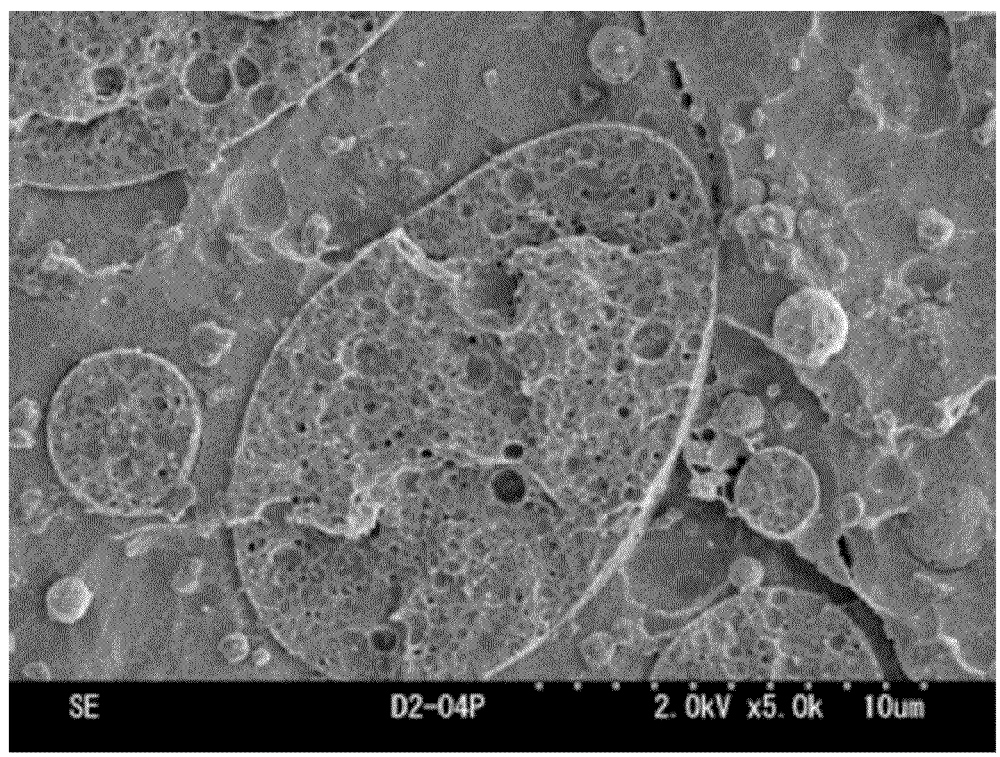
FIG. 9 is an explanatory diagram illustrating a resin phase separated structure by FE-SEM observation of a sample which is etched with oxygen plasma at 100 W for 1 minute and then coated with osmium in Example 15.
Figure 10:
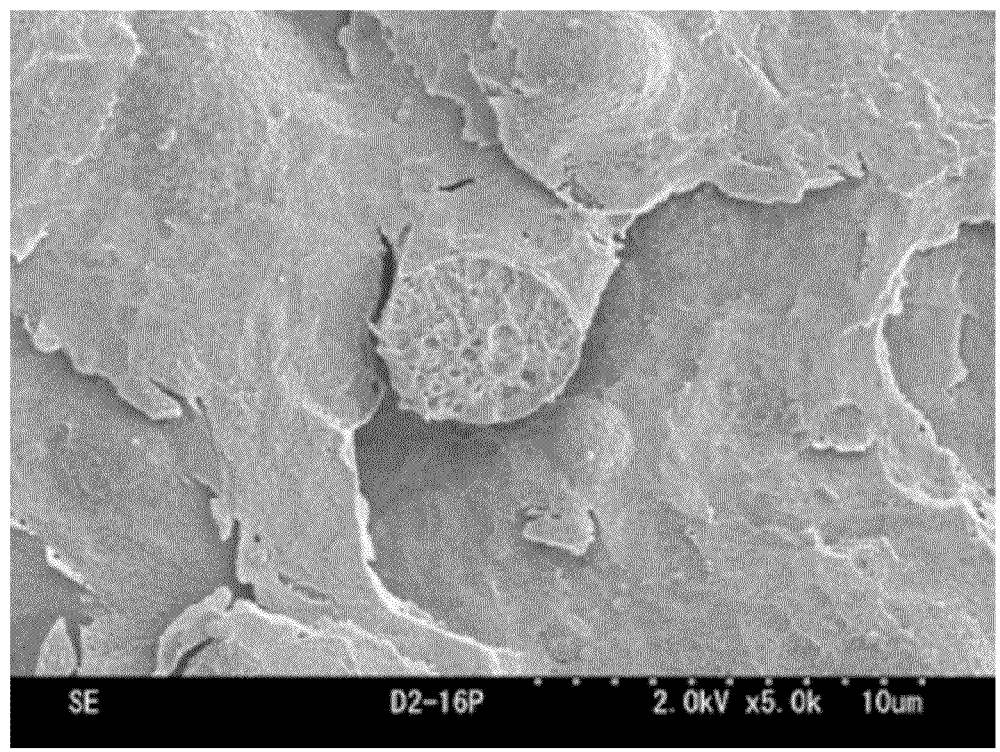
FIG. 10 is an explanatory diagram illustrating a resin phase separated structure by FE-SEM observation of a sample which is etched with oxygen plasma at 100 W for 1 minute and then coated with osmium in Example 16.
Figure 11:
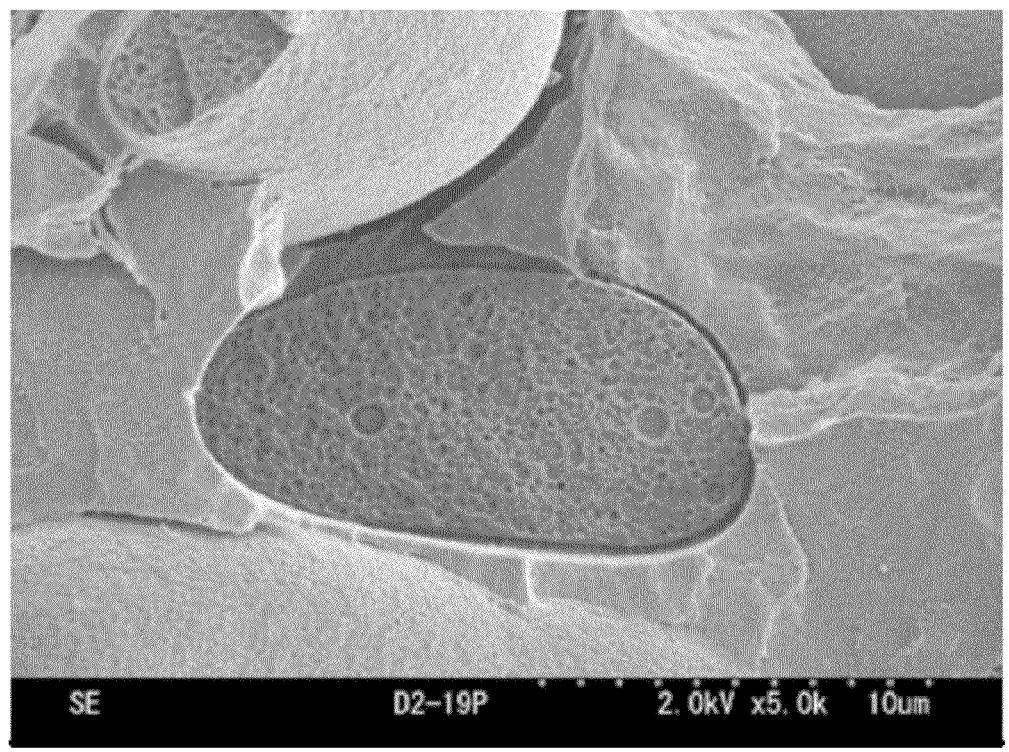
FIG. 11 is an explanatory diagram illustrating a resin phase separated structure by FE-SEM observation of a sample which is etched with oxygen plasma at 100 W for 1 minute and then coated with osmium in Example 17.
Figure 12:
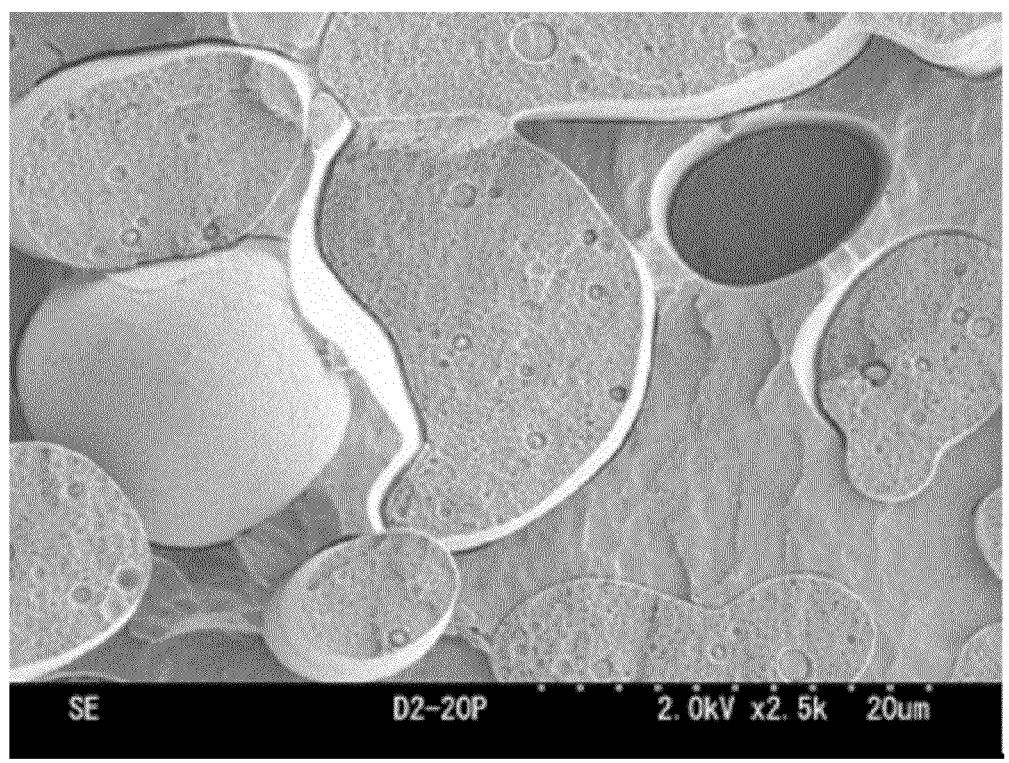
FIG. 12 is an explanatory diagram illustrating a resin phase separated structure by FE-SEM observation (low-magnification) of a sample which is etched with oxygen plasma at 100 W for 1 minute and then coated with osmium in Example 18.
Figure 13:
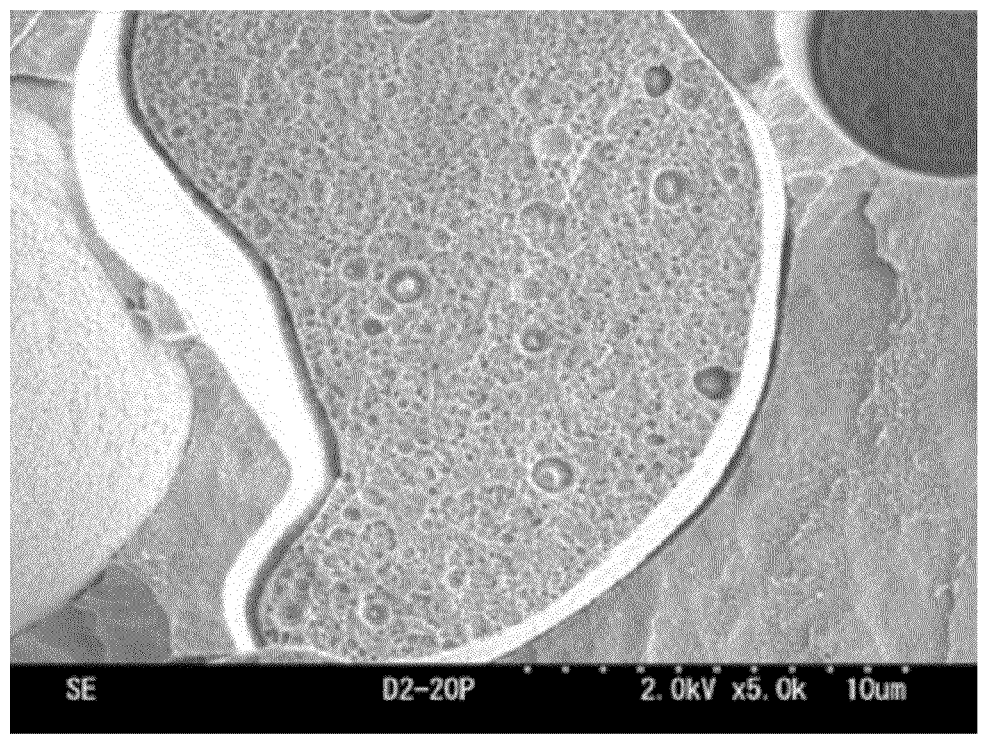
FIG. 13 is an explanatory diagram illustrating a resin phase separated structure by FE-SEM observation of a sample which is etched with oxygen plasma at 100 W for 1 minute and then coated with osmium in Example 18.
Figure 14:
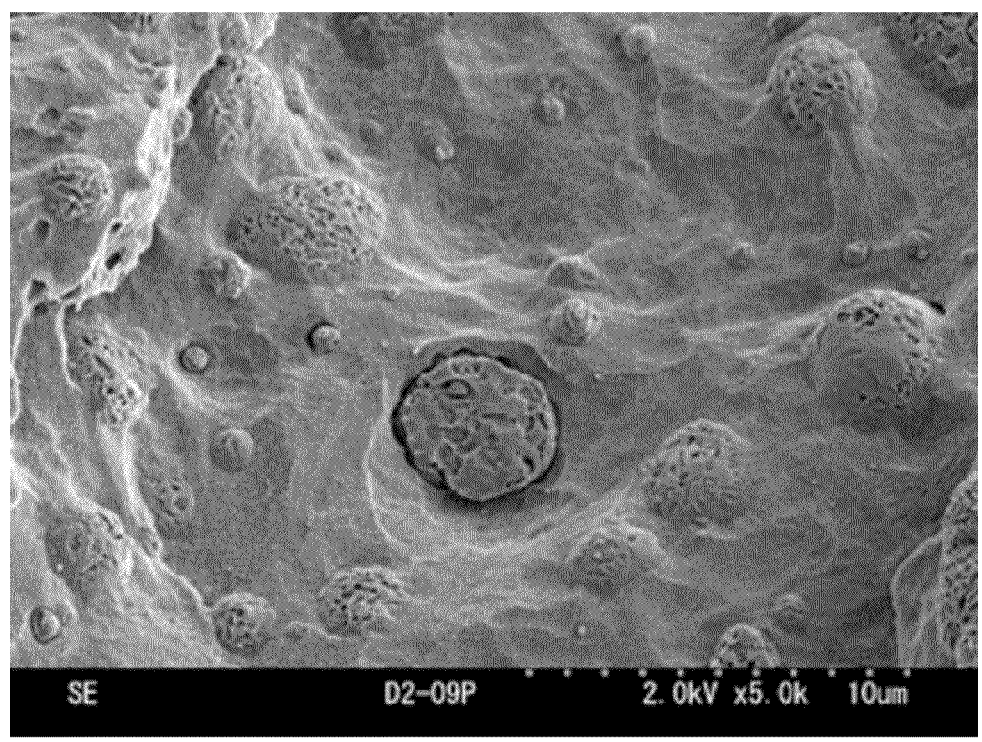
FIG. 14 is an explanatory diagram illustrating a resin phase separated structure by FE-SEM observation of a sample which is etched with oxygen plasma at 100 W for 1 minute and then coated with osmium in Example 19.
Figure 15:
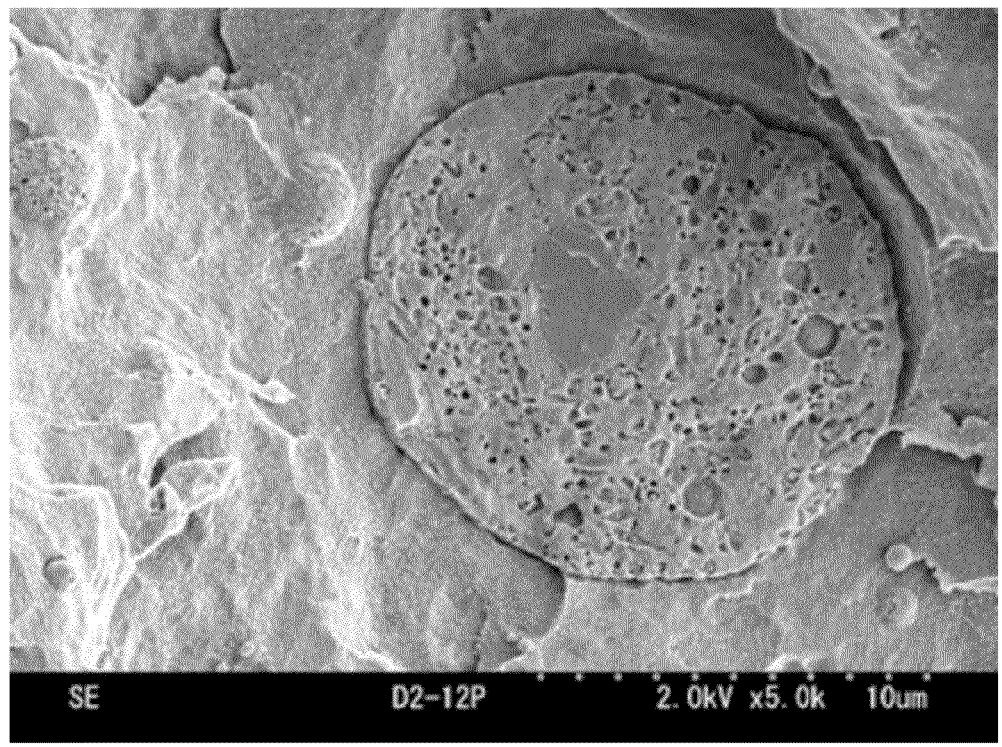
FIG. 15 is an explanatory diagram illustrating a resin phase separated structure by FE-SEM observation of a sample which is etched with oxygen plasma at 100 W for 1 minute and then coated with osmium in Example 20.
Figure 16:
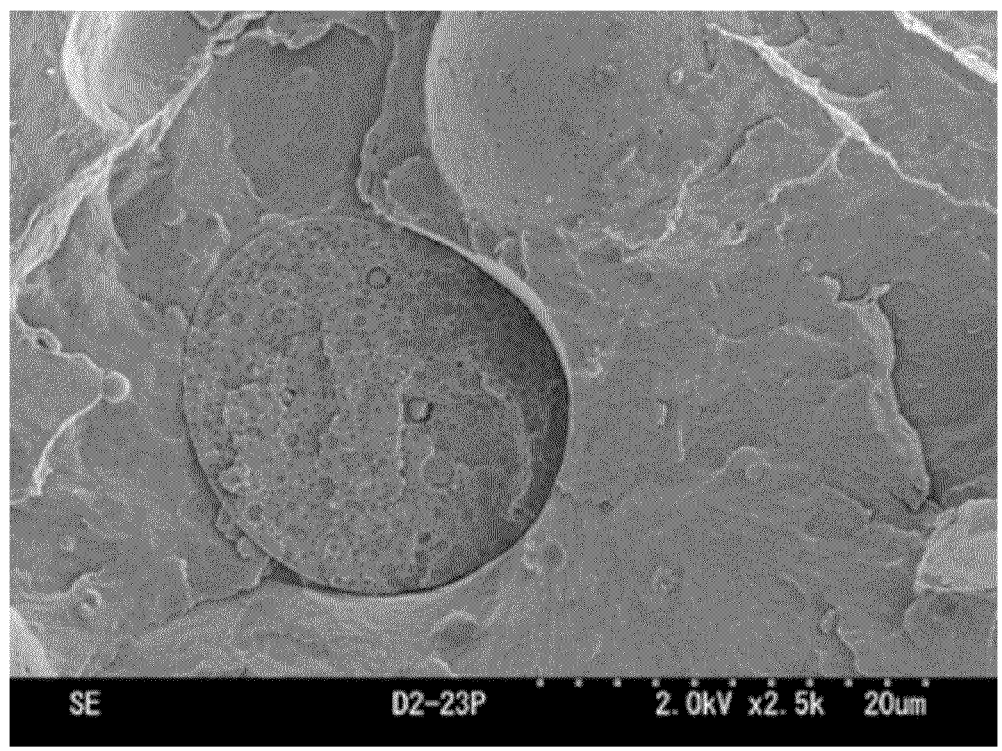
FIG. 16 is an explanatory diagram illustrating a resin phase separated structure by FE-SEM observation (low-magnification) of a sample which is etched with oxygen plasma at 100 W for 1 minute and then coated with osmium in Example 21.
Figure 17:
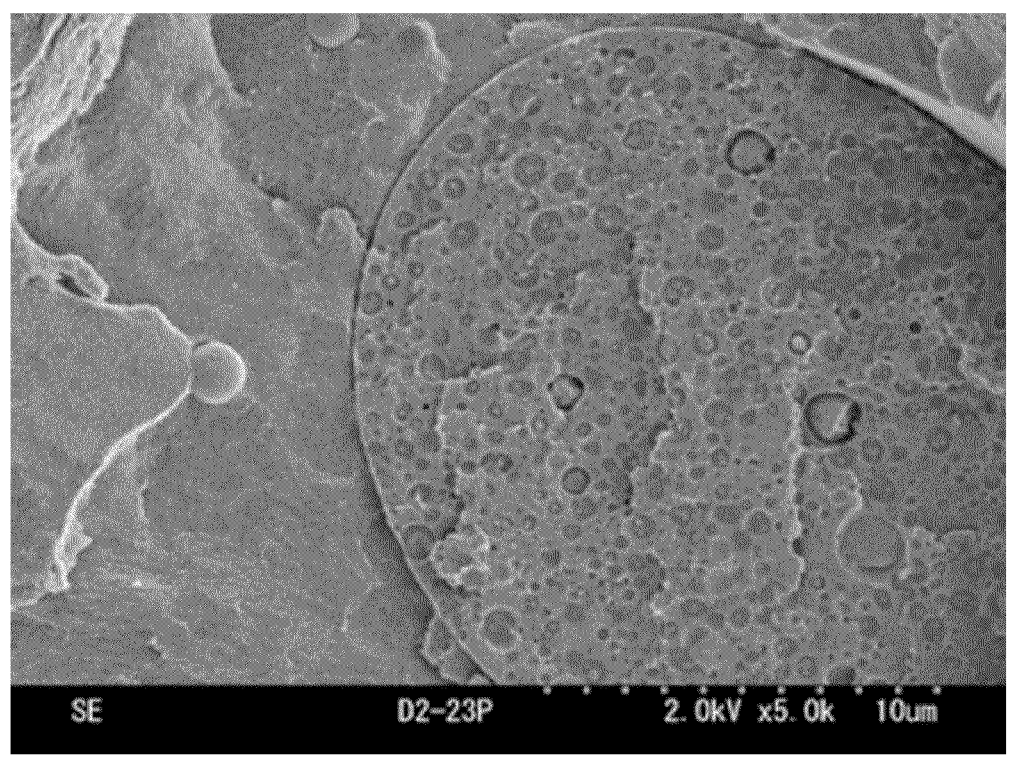
FIG. 17 is an explanatory diagram illustrating a resin phase separated structure by FE-SEM observation of a sample which is etched with oxygen plasma at 100 W for 1 minute and then coated with osmium in Example 21.

| | | | | Example | | | | | | | | | |
|---|---|---|---|---|---|---|---|---|---|---|---|---|---|
| | | | | 12 | 13 | 14 | 15 | 16 | 17 | 18 | 19 | 20 | 21 |
| Mixing ratio (% by mass) | A | Polyamide | PA12 | 25 | — | — | — | — | — | — | — | — | — |
| | | | PA6 | — | 25 | — | — | — | — | — | — | — | — |
| | | | PA610 | — | — | 25 | 40 | — | — | — | — | — | — |
| | | | PA1010 | — | — | — | — | 25 | 40 | 55 | — | — | — |
| | | | PAMXD6 | — | — | — | — | — | — | — | 25 | 40 | — |
| | | | PA10T | — | — | — | — | — | — | — | — | — | 25 |
| | B | Polyolefin | | 65 | 65 | 65 | 50 | 65 | 50 | 35 | 65 | 50 | 65 |
| | C | compatibilizer (Anhydrous maleic acid-modified EBR) | | 10 | 10 | 10 | 10 | 10 | 10 | 10 | 10 | 10 | 10 |
| Property | Type of phase separation structure | | | Continuous phase: PP, Dispersed phase: PA | | | | | | | | | |
| | Average diameter (nm) of dispersed subdomain | | | 70-600 | 70-1,000 | 30-800 | 10-800 | 20-800 | 30-1,200 | 50-600 | 30-500 | 10-700 | 20-700 |
| | Presence or absence of dispersed subdomain in dispersed phase | | | Present | Present | Present | Present | Present | Present | Present | Present | Present | Present |
| | Charpy impact strength (kJ/m$^2$) | | | 7.7 | 8.0 | 5.4 | 8.6 | 3.0 | 2.1 | 4.8 | 3.0 | 2.2 | 1.0 |
| | Flexural modulus (MPa) | | | 1,434 | 1,364 | 1,390 | 1,370 | 1,230 | 1,350 | 1,340 | 1,650 | 1,930 | 1,440 |
| | SEM image (Reference numeral) | | | FIG. 5 | FIG. 6 | FIG. 7 | FIGS. 8, and 9 | FIG. 10 | FIG. 11 | FIGS. 12, and 13 | FIG. 14 | FIG. 15 | FIGS. 16, and 17 |

[5] Evaluation of Thermoplastic Resin Composition (Examples 12 to 21)

Test pieces for evaluation obtained in Examples 12 to 21 of the above section [4] were subjected to measurement of Charpy impact strength, observation of morphology, and measurement of flexural modulus in the same manner as those in the above section [2]. Results thereof were shown in Table 4 and FIGS. 5 to 17.

[6] Evaluation Result

According to the results in Table 4, and images in FIGS. 5 to 17, it could be seen that the resin phase separated structures in the test pieces from Examples 12 to 21 applying various polyamide resins include a continuous phase and a dispersed phase and additionally a dispersed subdomain having an average diameter of 10 to 1,200 nm in the dispersed phase (that is, a salami structure).

Further, it is found that test pieces of Examples 12 to 21 had flexural moduli of 1,230 to 1,930 MPa, and Charpy impact strengths of 1.0 to 8.6 kJ/m', and that Examples 12 to 21 were excellent in impact strength as well as rigidity.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

EXPLANATIONS OF NUMERALS

1: continuous phase, 2: dispersed phase, 3: dispersed subdomain

The invention claimed is:
1. A thermoplastic resin composition formed by mixing a polyolefin resin, a polyamide resin, and a compatibilizer, wherein
   the compatibilizer is a modified elastomer comprising a reactive group that can react with the polyamide resin,
   the elastomer is a styrene-based thermoplastic elastomer or an olefin-based thermoplastic elastomer consisting of a copolymer of an α-olefin having 3 to 8 carbon atoms and ethylene or propylene,
   the thermoplastic resin composition has a resin phase separated structure which is observed with an electron microscope,
   the resin phase separated structure has a continuous phase, a dispersed phase having an average diameter of 10,000 nm or less that is dispersed in the continuous phase, and a dispersed subdomain having an average diameter of from 5 to 1,200 nm in the dispersed phase, and
   the continuous phase is formed of the polyolefin resin, the dispersed phase is formed of the polyamide resin, and the dispersed subdomain is formed of at least one of the compatibilizer or a reaction product of the compatibilizer and the polyamide resin.

2. A production method of the thermoplastic resin composition according to claim 1, comprising:
   melt-blending the polyolefin resin and a mixed resin, which was obtained by melt-blending the polyamide resin and the compatibilizer.

\* \* \* \* \*